(12) United States Patent
Hartmann et al.

(10) Patent No.: US 12,321,160 B2
(45) Date of Patent: Jun. 3, 2025

(54) ONLINE MULTI-FORCE-ADAPTION DURING MACHINING

(71) Applicant: Siemens Aktiengesellschaft, Munich (DE)

(72) Inventors: Dirk Hartmann, Aßling (DE); Michael Jaentsch, Princeton, NJ (US); Tobias Kamps, Munich (DE); Birgit Obst, Munich (DE); Daniel Regulin, Munich (DE); Florian Ulli Wolfgang Schnös, Mering (DE); Sven Tauchmann, Chemnitz (DE)

(73) Assignee: Siemens Aktiengesellschaft, Munich (DE)

( * ) Notice: Subject to any disclaimer, the term of this patent is extended or adjusted under 35 U.S.C. 154(b) by 315 days.

(21) Appl. No.: 17/775,839

(22) PCT Filed: Nov. 18, 2020

(86) PCT No.: PCT/EP2020/082475
§ 371 (c)(1),
(2) Date: May 10, 2022

(87) PCT Pub. No.: WO2021/099349
PCT Pub. Date: May 27, 2021

(65) Prior Publication Data
US 2022/0382265 A1 Dec. 1, 2022

(30) Foreign Application Priority Data

Nov. 19, 2019 (EP) ..................................... 19209939

(51) Int. Cl.
*G05B 19/418* (2006.01)

(52) U.S. Cl.
CPC ................. *G05B 19/41885* (2013.01); *G05B 2219/33301* (2013.01); *G05B 2219/39573* (2013.01)

(58) Field of Classification Search
CPC ............ G05B 19/41885; G05B 19/404; G05B 2219/33301; G05B 2219/39573; G05B 2219/32215
See application file for complete search history.

(56) References Cited

U.S. PATENT DOCUMENTS

2005/0116673 A1* 6/2005 Carl .................... A61B 17/1626
318/432
2009/0281652 A1* 11/2009 Tashiro ................ G05B 19/404
700/178
(Continued)

FOREIGN PATENT DOCUMENTS

CN 101007533 A 8/2007
CN 101140460 A 3/2008
(Continued)

OTHER PUBLICATIONS

PCT International Search Report and Written Opinion of International Searching Authority mailed Mar. 3, 2021 corresponding to PCT International Application No. PCT/EP2020/082475 filed Nov. 18, 2020.

*Primary Examiner* — Nicholas Klicos
(74) *Attorney, Agent, or Firm* — Schmeiser, Olsen & Watts LLP (57) ABSTRACT

A method for operating a numerical controlled machine comprising receiving a sequence of control commands which, when executed by a numerical controlled machine, cause the numerical controlled machine to machine a workpiece to obtain a predetermined workpiece geometry, wherein the sequence of control commands includes while machining the workpiece based on the received sequence of (Continued)

control commands measuring a value of a first interaction parameter for a first position of the tool, comparing a measured value of the first interaction parameter for the first position of the tool with the simulated value of the first interaction parameter for the first position of the tool, and determining an adapted value of the second interaction parameter for a following position of the tool based on a result of the comparison.

18 Claims, 5 Drawing Sheets

(56) References Cited

U.S. PATENT DOCUMENTS

| | | | | |
|---|---|---|---|---|
| 2013/0046405 | A1* | 2/2013 | Shamoto | G05B 19/404 700/190 |
| 2013/0204404 | A1* | 8/2013 | Kerner | G05B 19/404 700/56 |
| 2016/0209829 | A1* | 7/2016 | Nakamura | G05B 19/19 |
| 2017/0227945 | A1* | 8/2017 | Wang | G05B 19/182 |
| 2018/0120808 | A1* | 5/2018 | Murakami | G05B 19/4103 |
| 2018/0307200 | A1 | 10/2018 | Boye | |
| 2018/0314227 | A1* | 11/2018 | Bretschneider | G05B 19/31 |
| 2020/0333764 | A1* | 10/2020 | Takahei | G05B 19/404 |

FOREIGN PATENT DOCUMENTS

| | | |
|---|---|---|
| CN | 101980091 A | 2/2011 |
| CN | 102510251 A | 6/2012 |
| CN | 102812262 A | 12/2012 |
| CN | 102873628 A | 1/2013 |
| CN | 104407568 A | 3/2015 |
| CN | 10515743 A | 12/2015 |
| CN | 108621188 A | 10/2018 |
| CN | 109154806 A | 1/2019 |
| DE | 102016216190 A1 | 3/2018 |
| DE | 102017206931 A1 | 10/2018 |
| WO | 2018041476 A1 | 3/2018 |
| WO | 2019210895 A1 | 11/2019 |

* cited by examiner

ONLINE MULTI-FORCE-ADAPTION DURING MACHINING

CROSS-REFERENCE TO RELATED APPLICATIONS

This application claims priority to PCT Application No. PCT/EP2020/082475, having a filing date of Nov. 18, 2020, which claims priority to EP Application No. 19209939.8, having a filing date of Nov. 19, 2019, the entire contents both of which are hereby incorporated by reference.

FIELD OF TECHNOLOGY

The following relates to a method for a computer-aided optimization of a numerically controlled machining of a workpiece. In particular, the following relates to a method for operating a numerical controlled machine, a control unit for a numerical controlled machine and a computer program for performing the method.

BACKGROUND

WO 2018/041476 A1 relates to a method for the computer-assisted optimization of a numerically controlled machining process of a workpiece using a machining module. The method is characterized in that in a first step, the machining process is simulated using a specified workpiece geometry and a sequence of control commands for controlling the machining module. Using the resulting simulation result, at least one characteristic variable of the machining process is then ascertained. The at least one characteristic variable is checked with respect to at least one specified optimization variable for a machining process of the workpiece using the machining module. If a deviation from at least one optimization variable is ascertained during the check, the sequence of control commands is adapted using an ascertained deviation between the at least one characteristic variable and the at least one optimization variable, and the simulating, ascertaining, and checking steps are carried out again using the adapted sequence of control commands. If all optimization criteria are satisfied, the resulting sequence of control commands is provided in order to produce the workpiece using the machining module. The aforementioned method expands a digital tool chain for manufacturing workpieces on machine tools which are numerically controlled using a sequence of control commands, thereby simplifying and improving the production of a sequence of control commands, i.e. NC code.

During machining of a workpiece with a tool of a numerical controlled machine, the tool will typically experience forces and torques. In case the numerical machine is not sufficiently stiff, the forces and/or torques may lead to a deflection of the tool.

The process of machining the workpiece with the numerical controlled machine may be simulated before actually modifying the workpiece. As a result of the simulation, a force experienced by the tool at a certain position may be obtained. The numerical controlled machine may than use the information obtained by the simulation process for counteracting a deflection due to a force acting on the tool by modifying the actual trajectory of the tool, for example.

The workpiece blank to be machined to obtain a workpiece with a predetermined workpiece geometry may have different properties than assumed for simulation. For example, the size of the workpiece blank or its ductility may deviate. Accordingly, the actual forces experienced by the tool may deviate from the simulated forces. Thus, correctly counteracting the deflection of the tool may become more difficult.

Hence, there may be a need for a method for operating a numerical controlled machine allowing for a more precise machining of a workpiece to obtain a workpiece with a geometry being closer to a predetermined workpiece geometry.

SUMMARY

It is proposed a method for operating a numerical controlled machine comprising receiving a sequence of control commands which, when executed by a numerical controlled machine, cause the numerical controlled machine to machine a workpiece to obtain a predetermined workpiece geometry, wherein the sequence of control commands comprises
information on a discretised tool path defined by a sequence of support points information on a simulated value of a first interaction parameter describing an interaction of a tool of the numerical machine with the workpiece for each support point information on a simulated value of at least a second interaction parameter describing an interaction of the tool of the numerical machine with the workpiece for each support point, while machining the workpiece based on the received sequence of control commands measuring a value of the first interaction parameter for a first position of the tool, comparing the measured value of the first interaction parameter for the first position of the tool with the simulated value of the first interaction parameter for the first position of the tool, determining an adapted value of the second interaction parameter for a following position of the tool based on a result of the comparison.

The first position and/or the following position of the tool may correspond to a support point of the discretized tool path. Alternatively, the first position and/or the following position of the tool may be a position between two support points of the discretized tool path.

In an embodiment of the method, each support point indicates a movement trajectory to be performed by a tool of the machine to the next support point. The movement trajectory from each support point to the next support points may correspond to linear movements. For example, it may be indicated to go directly to from the current position $x_1$, $y_1$ and $z_1$ to position $x_2$, $y_2$ and $z_2$. Alternatively, it may be indicated to go to the position $x_2$, $y_2$ and $z_2$ via a trajectory which follows the arc of a circle having a centre $x_c$, $y_c$, $z_c$ and a radius r. The whole discretised tool path may consist of basic movement trajectories like linear motion and arcs. The positions to go to may also be indicated in circular or spherical coordinates.

Simulating the machining process before actually machining the workpiece to obtain the values of the interaction parameters may avoid producing workpieces with a geometry not complying with the predetermined workpiece geometry. Said values may also be called simulated values.

In an embodiment, measuring a value of the first interaction parameter for a first position of the tool comprises measuring a current. Measuring a current may be possible even if the environment of the tool/workpiece interaction is influenced by cooling fluids or metal chips.

A further embodiment prescribes that the first interaction parameter is a torque experienced by the tool of the numerical controlled machine. The tool of the numerical controlled machine may be held in a spindle and the torque experienced by the tool may correspond to a torque experienced by the spindle. Said torque may relate to the current used to rotate the spindle.

In another embodiment, the second interaction parameter is a force experienced by the tool of the numerical controlled machine. The force may correspond to a force expressed in three dimensions. A value of the force may correspond to a vector or a scalar. The force experienced by the tool may correspond to a cutting force. The cutting force or a torque may be experienced by a tool rotated by the numerical controlled machine. The force and the torque may also be experiences by a feed rate or by a workpiece and tool material. The cutting force may have a direct influence on the deflection of the tool during machining of the workpiece and the obtainable tolerances. Information on the cutting force may help to keep the tolerances within prescribed limits. Moreover, cutting forces and torques may have direct influence on the surface quality of the final workpiece. The same applies to a temperature of the workpiece at the machining point. In addition, forces, torques and temperatures may influence wear of the tool. Thus, the numerical controlled machine may determine when the tool is to be changed due to too much wear. Vice versa, the wear of the tool may also influence the torque and/or forces experienced by the tool, which may lead to deviations between the simulated values and the actual values. Hence, the proposed method may also help to obtain the predetermined geometry with a used tool.

According to an additional embodiment, determining an adapted value of the second interaction parameter for a following position of the tool based on a result of the comparison comprises determining the adapted value of the second interaction parameter for a following position of the tool based on a result of the comparison and the value of the first interaction parameter of the following position.

A further embodiment prescribes that the sequence of control commands comprises information for determining the adapted value of the second interaction parameter. The information may correspond to a mathematical formula, a constant and/or an algorithm. The mathematical formula, the constant and or the algorithm may have been determined during simulation of the machining process.

In another embodiment, the numerical controlled machine is one of a lathe, a milling machine, a drilling machine or a grinding machine.

According to an additional embodiment, the method comprises measuring values of the first interaction parameter for several subsequent positions of the tool, comparing the measured values of the first interaction parameter for the subsequent positions of the tool with the simulated values of the first interaction parameter for the subsequent positions of the tool, filtering the results of the comparisons determining an adapted value of the second interaction parameter for a following position of the tool based on a filtered result of the comparisons.

A further embodiment prescribes that the method comprises measuring values of the first interaction parameter for several subsequent positions of the tool, filtering the measured values of the first interaction parameter, comparing the filtered values of the first interaction parameter for the subsequent positions of the tool with the simulated values of the first interaction parameter for the subsequent positions of the tool, and determining an adapted value of the second interaction parameter for a following position of the tool based on a result of the comparisons.

In another embodiment, filtering comprises using a low-pass filter.

According to an additional embodiment, filtering comprises using a filter adapted to a feature of the predetermined workpiece geometry.

Furthermore, it is proposed a control unit for a numerical controlled machine, wherein the control unit is configured for carrying out any one of the above-mentioned methods.

In addition, the disclosure relates to a computer program or a computer program product including a computer program product (non-transitory computer readable storage medium having instructions, which when executed by a processor, perform actions which cause the computer to carry out any one of the above-described methods.

BRIEF DESCRIPTION

Some of the embodiments will be described in detail, with reference to the following figures, wherein like designations denote like members, wherein.

DETAILED DESCRIPTION

Figure 1:
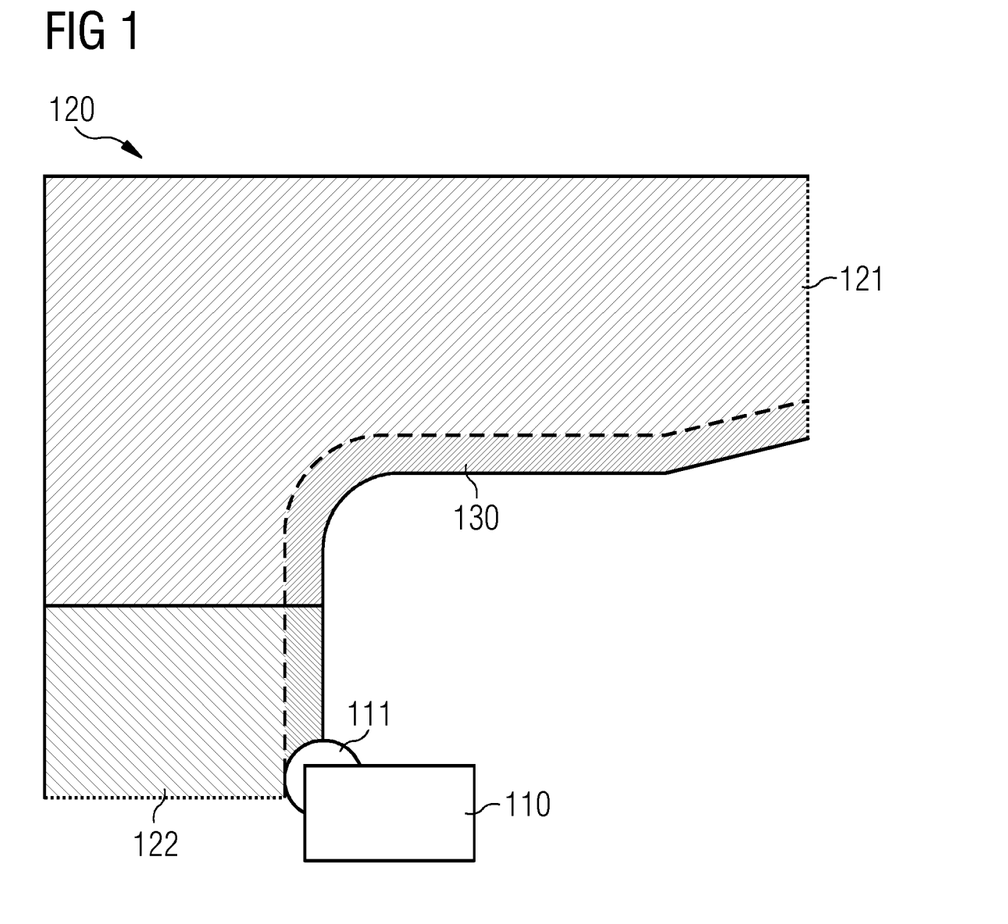
FIG. 1 illustrates a tool path for machining a workpiece.

FIG. 1 shows a numerical controlled machine 110 in form of a milling machine, operating a tool 111 in form of a milling cutter. The tool 111 can rotate around an axis R to remove material from a workpiece 120 coming in contact with the tool 111. In the example, the axis R is parallel to the axis z. The workpiece 120 comprises a first portion 121 made of a first material and a second portion 122 made of a second material. The first material and the second material may have different properties. For example, machining the first material may be more difficult than machining the second material.

The rotating tool 111 can be moved along tool path 130 to machine the workpiece 120 to obtain a predetermined workpiece geometry indicated with a dotted line. In the example shown in FIG. 1 the tool path 130 lies in a single plane defined by an axis x and an axis y. Moreover, the rotation axis of the rotating tool 111 is not changed. Generally, the tool path 130 may describe an arbitrary trajectory in the three-dimensional space and include information on a changing orientation of the rotating axis R in the three dimensional space.

During machining of the workpiece 120 with the tool 111, the tool 111 will experience forces and torques. In case the machine 110 is not sufficiently stiff, the forces and/or torques may lead to a deflection of the tool 111. In particular, larger forces or torques increase the deflection and robots may have lower stiffness than machining centres. The deflections may result in a workpiece having a geometry not corresponding to the intended predetermined workpiece geometry. In particular, deviations between the actual workpiece geometry and the intended predetermined workpiece geometry may surpass predetermined tolerances.

Figure 2:
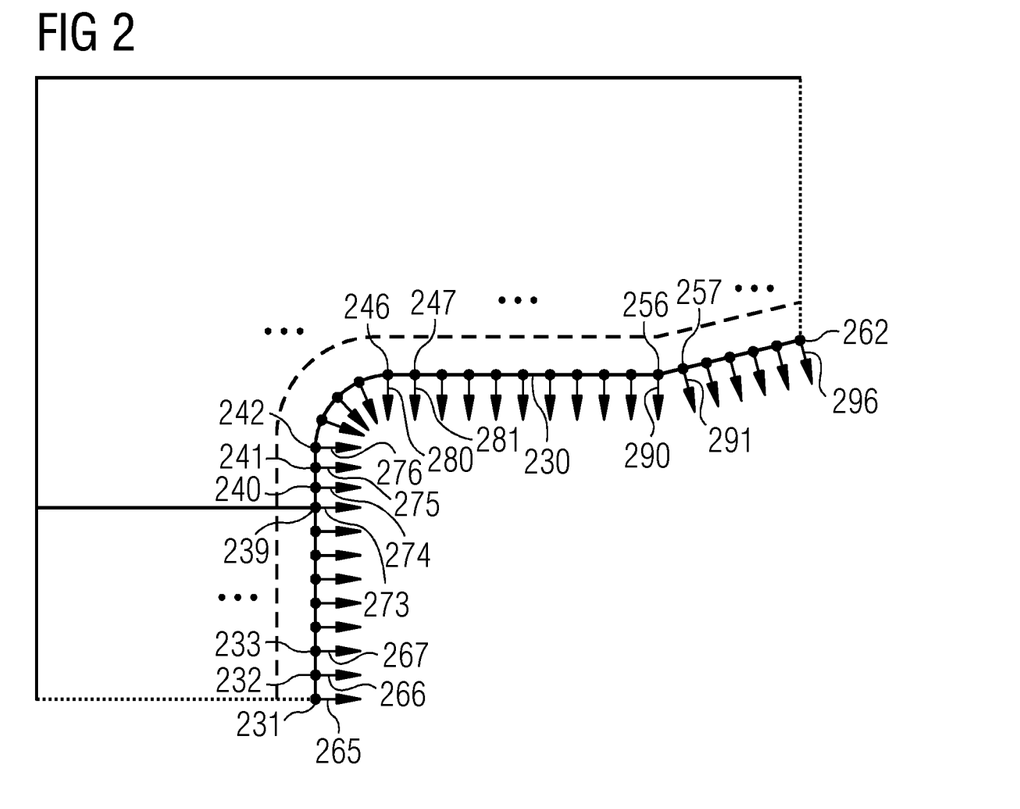
FIG. 2 illustrates a first discretised tool path.

In order to generate a sequence of control commands for controlling the numerical controlled machine 110 to machine the workpiece 120, the tool path 130 may be discretised in smaller portions and a first discretised tool path 230 shown in FIG. 2 may be obtained. The first discretised tool path 230 may be defined by a first sequence of support points 231 to 262. Each support point 231 to 262 may define a movement to be performed by the tool 111 to the next support point.

The process of machining the workpiece 120 with the numerical controlled machine 110 may be simulated before actually modifying the workpiece 120. Heretofore, the first discretised tool path 230 may be used. For each of the support points of the first sequence of support points 231 to 262, at least one interaction parameter 265 to 296, respectively, may be obtained. The simulation may take into account the material of the workpiece 120 and the tool 111 for modifying the geometry of the workpiece. For example, the interaction parameter may correspond to a torque experienced by the tool 111 or a temperature of the tool 111 or a temperature of the workpiece 120 or a force experienced by the tool 111 at the respective support point 231 to 262. Information on the at least one interaction parameter may be used by the numerical controlled machine 110 to counteract undesired consequences if the value of an interaction parameter 265 to 296 surpasses a critical threshold. For example, the numerical controlled machine 110 may provide extra cooling at the interface of the tool 111 and the workpiece 120, if the temperature determined for the respective support point 231 to 262 is too high. Moreover, the numerical controlled machine 110 may counteract a deflection due to a force acting on the tool 111 by modifying the actual trajectory of the tool 111. In FIG. 2, simulated forces 265 to 296 acting on the tool 111 during machining are shown.

Figure 3:
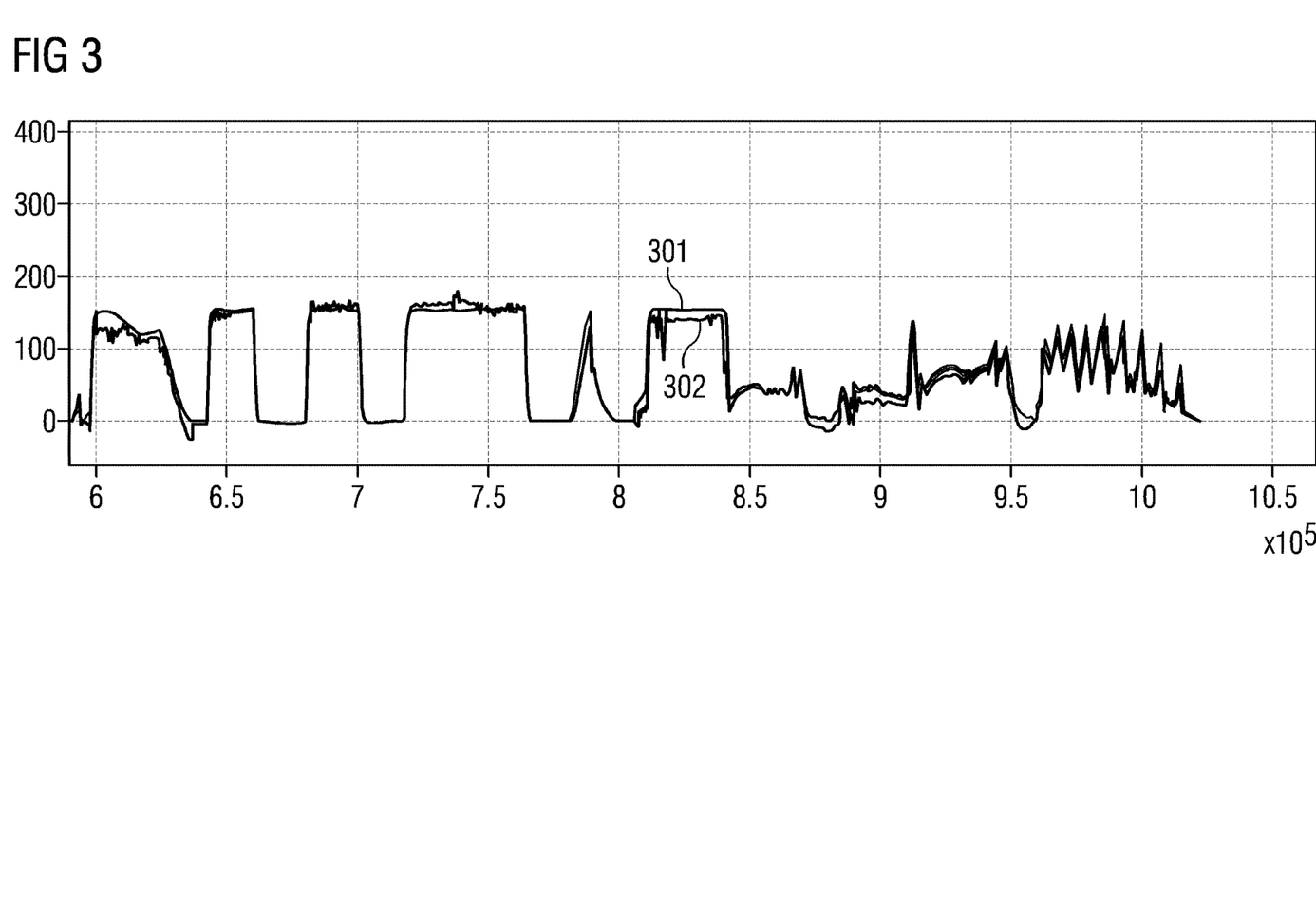
FIG. 3 illustrates simulated and measured values of a first interaction parameter.

FIG. 3 illustrates simulated and measured values of a first interaction parameter obtained for an exemplary machining process. In the example, the first interaction parameter is a torque. The simulated values 301 and measured values 302 of the torque are depicted over time. The torque values and the time are expressed in arbitrary units. The curve of the measured values 302 essentially follows the curve of the simulated values. However, in cases of changing torque values differences are observable. The differences in the torque values may indicate that also the forces experienced by the tool of the numerical controlled machine change.

Figure 4:
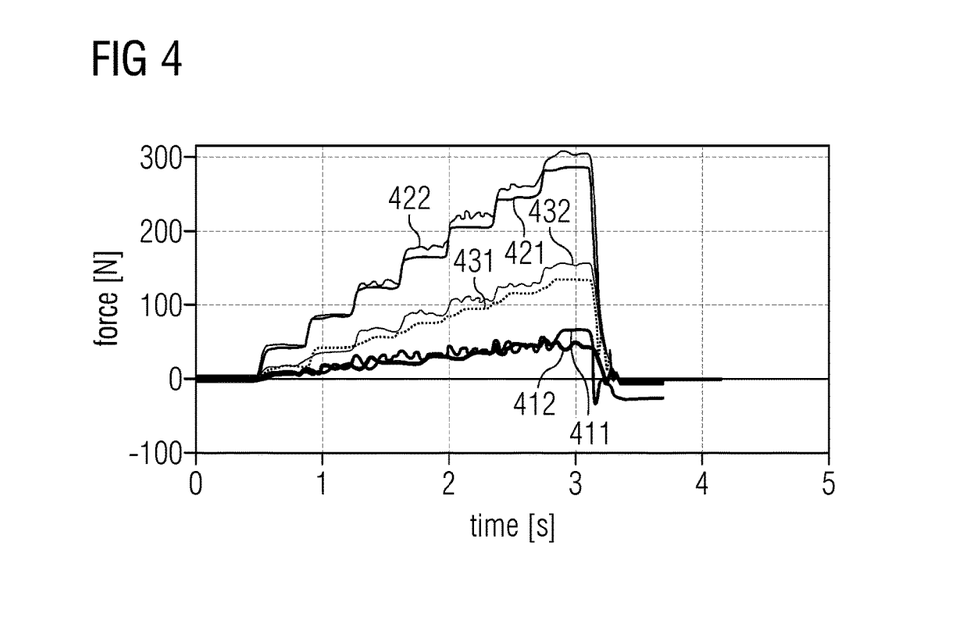
FIG. 4 illustrates simulated and measured values of second interaction parameters.

FIG. 4 illustrates simulated and measured values of second interaction parameters. In the example, the second interaction parameters are forces in x-direction (411, 412), in y-direction (421, 422) and in z-direction (431, 432) over machining time. The curves 411, 421, 431 correspond to simulates of the forces in x-direction, y-direction and z-direction, respectively. Correspondingly, the Curves 412, 422, 432 correspond to the measured values in x-direction, y-direction and z-direction.

For higher forces the difference between the simulated and the measured values of the second interaction parameters increases. Moreover, differences between the simulated and measured values of the second interaction parameters are more pronounced.

Values of the first interaction parameter may be known from the simulation. In addition, values of the first interaction parameter during the machining process may be easier to measure than values of the second interaction parameters.

For example, a torque experienced by the tool 111 of the numerical controlled machine 110 during machining may correspond to a current required for turning a spindle of the numerical controlled machine 110.

Variations concerning the process parameters for machining the workpiece, for example, the selection of a tool 111 different from the tool assumed for the simulation, a different feed speed selected by an operator of the numerical controlled machine, a different material of the workpiece than originally projected, a different geometry of the blank workpiece, may result in measured values of the second interaction parameters differing from the simulated values of the second interaction parameters. The second interaction parameters may be difficult to measure during machining of the workpiece. For example, measuring forces experienced by the tool during machining may be very challenging. The second interaction parameters may be linked to the first interaction parameter.

It is proposed to use the measured and simulated values of the first interaction parameter to obtain adapted values of the second interaction parameters. Said adapted values of the second interaction parameters can then be used by the numerical controlled machine for counteracting undesired machine behaviour, for example, a deflection of the tool 111 during machining. Torque deviations may be used to derive adapted force values from the simulated force values.

In particular, it is proposed to calculate the adapted forces using the following formula:

$$F_{adapted} =$$

$$\begin{bmatrix} F_{Xadapted} \\ F_{Yadapted} \\ F_{Zadapted} \end{bmatrix} = \begin{bmatrix} 1 + k_{MX} \cdot \Delta M & 0 & 0 \\ 0 & 1 + k_{MY} \cdot \Delta M & 0 \\ 0 & 0 & 1 + k_{MZ} \cdot \Delta M \end{bmatrix} \cdot \begin{bmatrix} F_{Xsimulated} \\ F_{Ysimulated} \\ F_{Zsimulated} \end{bmatrix}$$

with $$\Delta M = (M_{measured} - M_{simulated})$$

The variable F relates to forces and the variable M to torques. The parameter k describes the influence of torque differences on the forces. In the example of the formula depicted above, the parameter k may be a constant describing a linear dependency of the forces on the torque difference. For example, the linear relation may correspond to a linear relation between a spindle torque and a feed rate. However, it is also possible that the second interaction parameters shows a quadratic or cubic dependency on the first interaction parameter. Generally, the dependency may be determined using neural networks or using a model of the processing environment.

Figure 5:
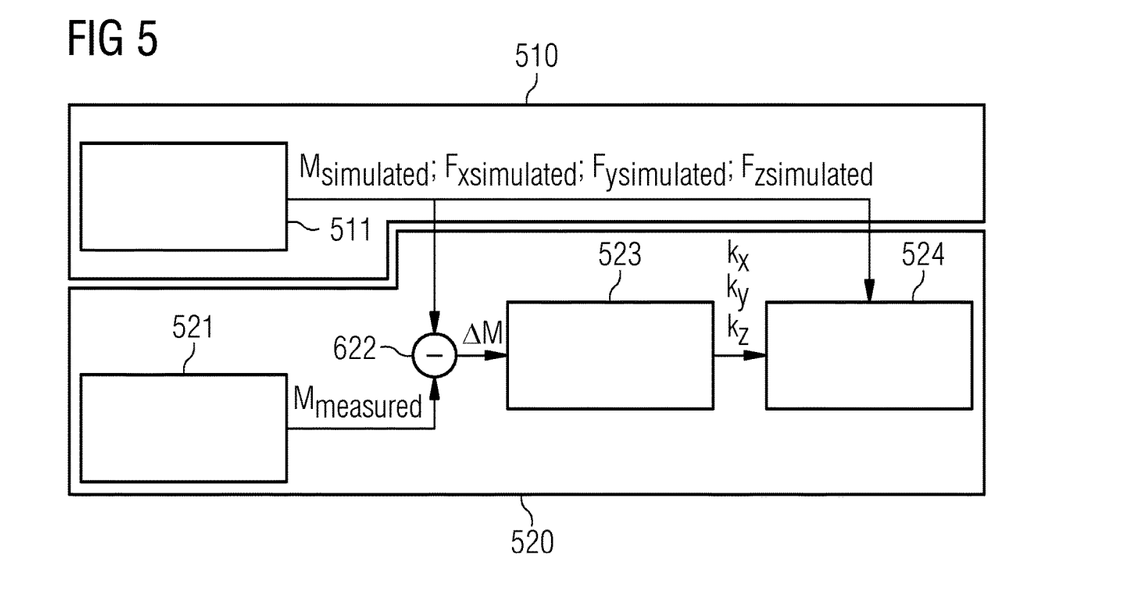
FIG. 5 illustrates a method for operating a numerical controlled machine.

FIG. 5 illustrates a method for operating a numerical controlled machine. The machining process is simulated with a simulating module 511 of a computer added manufacturing system 510. The simulating module 511 provides simulated values of the first interaction parameter (here: simulated spindle torque, $M_{simulated}$) and second interaction parameters (here: simulated forces, $F_{Xsimulated}$, $F_{Ysimulated}$, $F_{Zsimulated}$).

The computer added manufacturing provides a sequence of control commands to the control unit 520 of the numerical controlled machine used for machining the workpiece. The sequence of control commands includes the simulated values as mentioned above. During machining of the workpiece, a sensor unit 521 continuously receives measured values of the first interaction parameter (here: measured spindle torque, $M_{measured}$) from the machine. A comparing unit 622 compares the measured values of the first interaction parameter (here: $M_{measured}$) with the simulated values of the first interaction parameter (here: $M_{simulated}$) and provides a result of the comparison (here: $\Delta M$) to an algorithm unit 523, which derives parameters (here: $k_X$, $k_Y$, $k_Z$) for adapting the forces for a following position of the tool. A second interaction parameters adaption unit 524 receives said parameters (here: $k_{MX}$, $k_{MY}$, $k_{MZ}$) and calculates the adapted values of the second interaction parameters (here: $F_{Xadapted}$, $F_{Yadapted}$, $F_{Zadapted}$) therefrom. The adapted values of the second interaction parameters $F_{Xadapted}$, $F_{Yadapted}$, $F_{Zadapted}$ are than used by the control unit 520 to control the machine. In particular, the machine or the control unit 620 may use the adapted values of the forces $F_{Xadapted}$, $F_{Yadapted}$, $F_{Zadapted}$ for counteracting a deflection due to the forces acting on the tool by modifying the actual trajectory of the tool.

Figure 6:
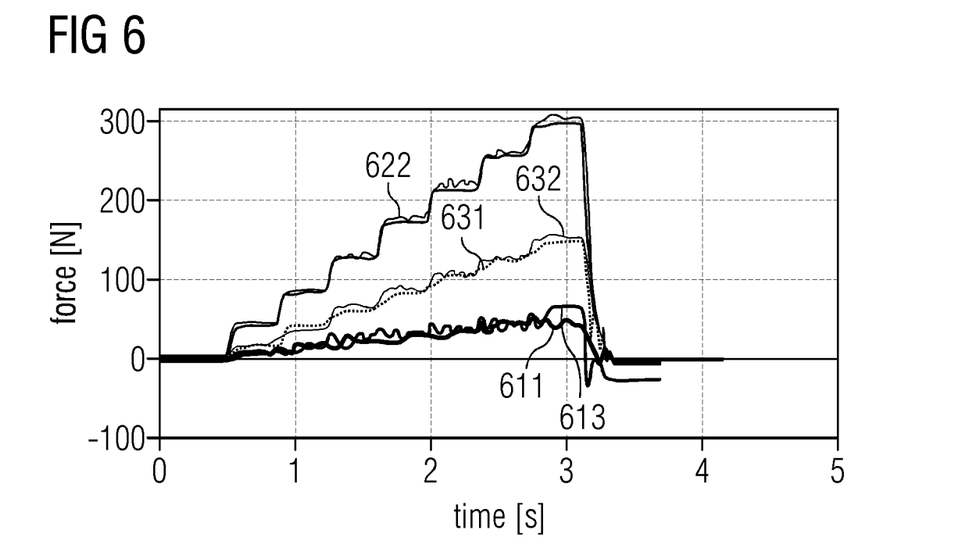
FIG. 6 illustrates adapted and measured values of second interaction parameters.

FIG. 6 illustrates adapted and measured values of second interaction parameters. The adapted values $F_{Xadapted}$ 613, $F_{Yadapted}$ 623, $F_{Zadapted}$ 633 are very close to the corresponding measured values 612, 622, 632. This indicates that adapting the values of the second interaction parameters based on a measurement of a first interaction parameter lead to good results.

In particular, a comparison of FIG. 4 and FIG. 6 shows that an adaptation allows for mentioning the workpiece with a better knowledge of the forces actually acting on the tool and therefore a better modification of the machining process to avoid the consequences of tool deflections. This may be particularly useful if high forces are to be expected, in particular, during roughing passes.

Figure 7:
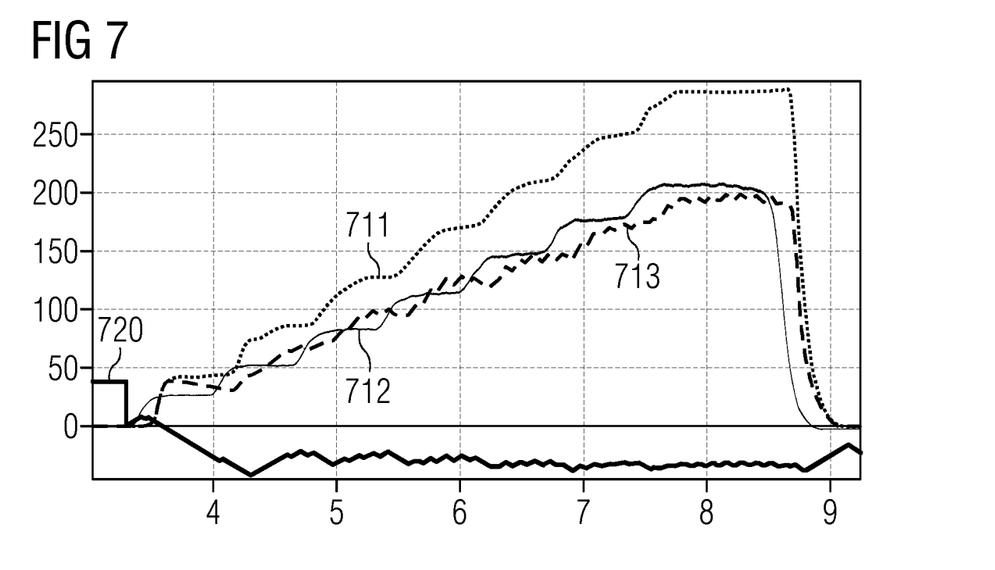
FIG. 7 illustrates adapted and measured values of second interaction parameters.

FIG. 7 shows another example of simulated values 711 of a second interaction parameter, measured values 712 of the second interaction parameters and adapted values 713 of the second interaction parameter. In the example, the values are shown as forces expressed in Newton over time expressed in arbitrary units. The adapted values 713 have been derived based on a deviation of measured values of a first interaction parameter with the simulated values of the first interaction parameter. In the example of FIG. 7, the first interaction parameter is a spindle in particular, curve 720 shows an adaptation coefficient expressed in percent (%) derived from the deviation of the measured values of the first interaction and the simulated values, wherein the adaptation coefficient has been used to adapt the values of the second interaction parameter.

The adaptation coefficient, or generally, an arbitrary functional dependency between simulated values of the first interaction parameter, measured values of the first interaction parameter, and adapted values of the second interaction parameter may be changed depending on a position of the tool on the tool path, a tool wear, and/or a material property of the workpiece. Of course, any other influence on the tool operation may also change that functional dependency. Furthermore, a change rate of the functional dependency may be adapted depending on the position of the tool or on other operating conditions.

In that way, a responsivity to deviations from a simulated behaviour can be adapted to various operating conditions. E. g. the responsivity may be reduced at the beginning of a tool path in order to smoothen an initial cut. Moreover, forces to be applied in response to such deviations may be limited to a safe amount.

Furthermore, the comparison of the measured value of the first interaction parameter for the first position of the tool with the simulated value of the first interaction parameter for the first position of the tool may be carried out by a controller of the numerically controlled machine. The comparison may generally be implemented as a quantification of a difference—$\Delta M$ in the above embodiment—between the measured value of the first interaction parameter for the first position of the tool and the simulated value of the first interaction parameter for the first position of the tool. The difference may be quantified as a floating-point value.

With that, the adapted value of the second interaction parameter may be determined continuously depending on that difference. Particularly, the adapted value of the second interaction parameter may be calculated as a continuous function of that difference. The adapted value of the second interaction parameter may then be used to control the numerically controlled machine. A change in the adapted value generally induces a change in the measured value of the first interaction parameter—$M_{measured}$ in the above embodiment. The measured value of the first interaction parameter may then be fed back to the controller of the numerically controlled machine, thus establishing a closed control loop with the measured value of the first interaction parameter as process variable, the simulated value of the first interaction parameter as reference variable, and the difference as control error. The closed loop control allows for a continuous control of the tool operation and continuous corrections of deviations from the simulation.

The counteractions for correcting deviations from the simulation, i.e. the application of the adapted values, are in a quantitative and continuous relation to the actually measured deviations from the simulation, i.e. to the measured differences. In particular, a lower difference may induce a lower counteraction and a higher difference may induce a higher counteraction, with a continuous and smooth transition between both cases. A respective counteraction may particularly depend on a corresponding difference in a linear, quadratic, or cubic manner as already mentioned above.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:
1. A method for operating a numerical controlled machine comprising:
　receiving a sequence of control commands which, when executed by a numerical controlled machine, cause a tool operated by the numerical controlled machine to move along a sequence of support points that define a discretised tool path to machine a workpiece to obtain a predetermined workpiece geometry, wherein the workpiece geometry is determined by the sequence of control points, and wherein the sequence of control commands comprises:
　information on a simulated value of a first interaction parameter describing an interaction of the tool with the workpiece for each support point, and
　information on a simulated value of at least a second interaction parameter describing an interaction of the tool with the workpiece for each support point,
　while machining the workpiece based on the received sequence of control commands: measuring a value of the first interaction parameter for a first position of the tool;
　comparing the measured value of the first interaction parameter for the first position of the tool with the simulated value of the first interaction parameter for the first position of the tool;

determining an adapted value of the second interaction parameter for a following position of the tool based on a result of the comparison;

controlling the numerically controlled machine by a controller;

quantifying a difference between the measured value of the first interaction parameter for the first position of the tool and the simulated value of the first interaction parameter for the first position of the tool;

feeding back the measured value of the first interaction parameter to the controller, thus establishing a closed control loop with the measured value of the first interaction parameter as process variable, the simulated value of the first interaction parameter as reference variable, and the difference as control error.

2. The method according to claim 1, wherein each support point indicates a movement trajectory to be performed by the tool to the next support point.

3. The method according to claim 1, wherein measuring a value of the first interaction parameter for a first position of the tool comprises measuring a current.

4. The method according to claim 1, wherein the first interaction parameter is a torque experienced by the tool.

5. The method according to claim 1, wherein the second interaction parameter is a force experienced by the tool.

6. The method according to claim 1, wherein determining an adapted value of the second interaction parameter for a following position of the tool based on a result of the comparison comprises determining the adapted value of the second interaction parameter for a following position of the tool based on a result of the comparison and the simulated value of the first interaction parameter of the following position.

7. The method according to claim 1, wherein the sequence of control commands comprises information for determining the adapted value of the second interaction parameter.

8. The method according to claim 7, wherein the information for determining the adapted value of the second interaction parameter is at least one of a mathematical formula, a constant or an algorithm.

9. The method according to claim 1, wherein the numerical controlled machine is a robot.

10. The method according to claim 1, wherein the method comprises:

measuring values of the first interaction parameter for several subsequent positions of the tool;

comparing the measured values of the first interaction parameter for the subsequent positions of the tool with the simulated values of the first interaction parameter for the subsequent positions of the tool;

filtering the results of the comparisons; and determining an adapted value of the second interaction parameter for a following position of the tool based on a filtered result of the comparisons.

11. The method according to claim 1, wherein the method comprises:

measuring values of the first interaction parameter for several subsequent positions of the tool;

filtering the measured values of the first interaction parameter;

comparing the filtered values of the first interaction parameter for the subsequent positions of the tool with the simulated values of the first interaction parameter for the subsequent positions of the tool; and determining an adapted value of the second interaction parameter for a following position of the tool based on a result of the comparisons.

12. The method according to claim 10, wherein filtering comprises using a low-pass filter.

13. The method according to claim 10, wherein filtering comprises using a filter adapted to a feature of the predetermined workpiece geometry.

14. The method according to claim 1, wherein a functional dependency between the simulated value of the first interaction parameter, the measured value of the first interaction parameter, and the adapted value of the second interaction parameter is changed depending on a position of the tool, a tool wear, and/or a material property of the workpiece.

15. The method according to claim 14, wherein a change rate of the functional dependency is adapted depending on a position of the tool.

16. A control unit for a numerical controlled machine, wherein the control unit is configured for carrying out the method according to claim 1.

17. The method according to claim 1, wherein the method comprises:

determining the adapted value of the second interaction parameter continuously depending on the difference; and controlling the numerically controlled machine by means of the adapted value of the second interaction parameter.

18. A computer program product, comprising a computer readable hardware storage device having computer readable program code stored therein, said program code executable by a processor of a computer system to implement a method, comprising instructions which, when executed by a computer, cause the computer to carry out the method according to claim 1.

* * * * *